US006832384B2

United States Patent
Yamaguchi

(10) Patent No.: US 6,832,384 B2
(45) Date of Patent: Dec. 14, 2004

(54) TURNTABLE ASSEMBLY HAVING DISC CENTERING LEAD SPRINGS CLAMPED BETWEEN UPPER SURFACE OF TURNTABLE AND AN INSERT-TYPE SPRING HOLDER

(75) Inventor: Tsuyoshi Yamaguchi, Marako-machi (JP)

(73) Assignees: Sanyo Electric Co., Ltd., Moriguchi (JP); Sanyo Seimitsu Co., Ltd., Chiisagata (JP)

( * ) Notice: Subject to any disclaimer, the term of this patent is extended or adjusted under 35 U.S.C. 154(b) by 105 days.

(21) Appl. No.: 10/269,065

(22) Filed: Oct. 11, 2002

(65) Prior Publication Data

US 2003/0107984 A1 Jun. 12, 2003

(30) Foreign Application Priority Data

Oct. 16, 2001 (JP) .................................... 2001-317947

(51) Int. Cl.[7] .............................................. G11B 7/24
(52) U.S. Cl. ...................................................... 720/724
(58) Field of Search ........................................ 360/270

(56) References Cited

U.S. PATENT DOCUMENTS 5,501,760 A * 3/1996 Mukawa .................... 156/305
5,633,856 A * 5/1997 Mukawa .................... 369/270
6,614,748 B2 * 9/2003 Shiomi et al. ............. 369/270

FOREIGN PATENT DOCUMENTS

JP 2000-113544 4/2000
JP 2000-251361 9/2000

* cited by examiner

Primary Examiner—David Davis
(74) Attorney, Agent, or Firm—Armstrong, Kratz, Quintos, Hanson & Brooks, LLP

(57) ABSTRACT

A turntable assembly not requiring use of plastic centering hooks, enabling simplification of the mold structure, and enabling attachment of the leaf springs imparting elastic spring force in the disk centering mechanism even after fitting the center hole of the turntable over the motor shaft, wherein the turntable assembly has a motor having a projecting motor shaft and a turntable having a center hole into which the projecting portion of the motor shaft is inserted and a magnet holding groove formed at a disk hole mating hub around the center hole and holding a permanent magnet for clamping an information storage disk placed on the turntable in the magnet holding groove, the disk centering mechanism having a plurality of spring seats at spring flexing spaces formed at intervals in the circumferential direction of the disk hole mating hub 21, each of the spring seats being provided with a centering leaf spring having a vertically descending piece protruding slightly outward in the radial direction from the outer circumference of the disk hole mating hub.

9 Claims, 5 Drawing Sheets

FIG.1A
PRIOR ART
FIG.1B
PRIOR ART
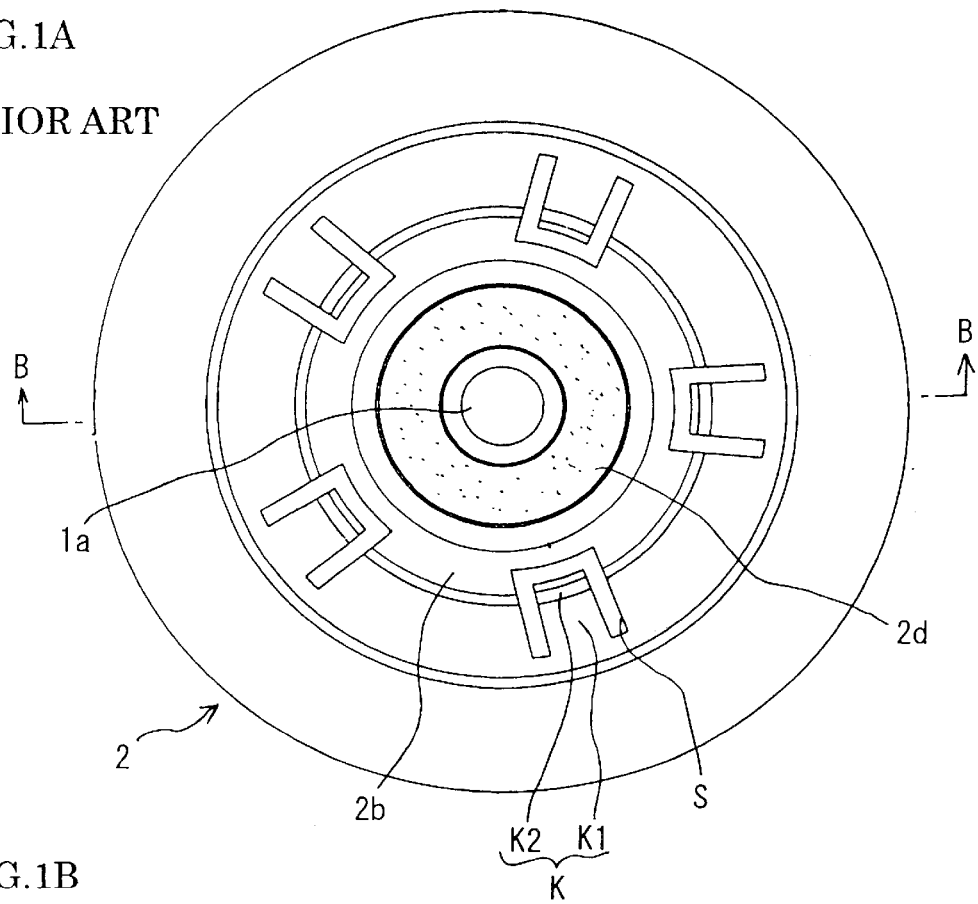
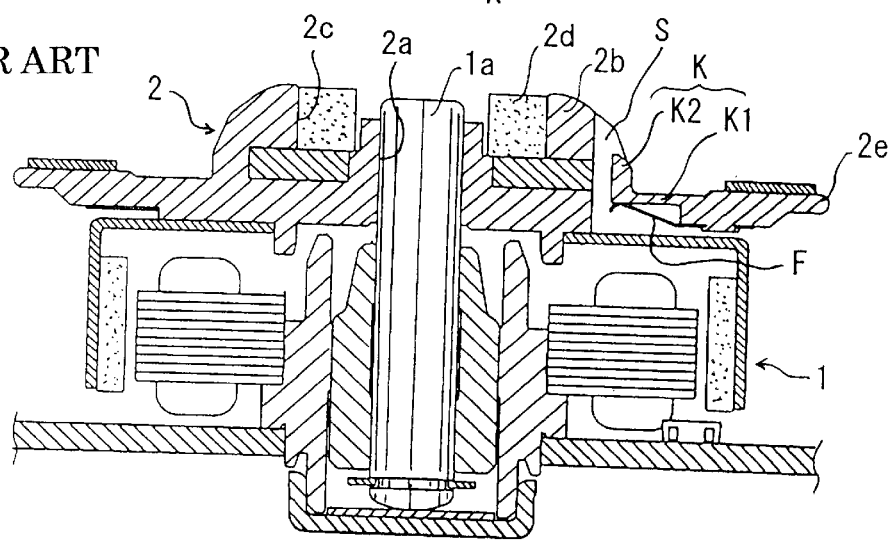

ns is required in the work of attaching the leaf springs.
This invites a drop in the work efficiency.

TURNTABLE ASSEMBLY HAVING DISC CENTERING LEAD SPRINGS CLAMPED BETWEEN UPPER SURFACE OF TURNTABLE AND AN INSERT-TYPE SPRING HOLDER

BACKGROUND OF THE INVENTION

1. Field of the Invention

The present invention relates to a turntable assembly for driving the rotation of a mini disk (MD) or other information storage disk, more particularly relates to an improvement of the centering mechanism for an information storage disk on a turntable.

2. Description of the Related Art

The turntable assembly disclosed in Japanese Unexamined Patent Publication (Kokai) No. 2000-113544 and Japanese Unexamined Patent Publication (Kokai) No. 2000-251361, as shown in FIG. 1A and FIG. 1B, has a motor 1 having a projecting motor shaft 1a and a plastic turntable 2 having a center hole 2a into which the projecting portion of the motor shaft 1a is inserted and a magnet holding groove 2c formed at the disk hole mating hub 2b around the center hole 2a. The magnet holding groove 2c holds a permanent magnet 2d for clamping the information storage disk placed on the turntable 2. The disk centering mechanism of the turntable assembly is comprised of a plurality of centering hooks K formed at equal intervals in the circumferential direction at the outer circumference of the disk hole mating hub 2b of the plastic turntable and leaf springs F for bottom support giving an elastic spring force upward to the centering hooks K at the back surface of a thin disk flange 2e. Each centering hook K is comprised of an elastic tongue K1 defined by a U-shaped slit S seen from the plan view straddling the disk hole mating hub 2b and the disk flange 2e and a hook K2 rising up at the top surface of the inside end of the elastic tongue K1. Due to the flexibility given by the plastic elasticity of the elastic tongue K1, the hook K2 can flex in the axial center direction. The reason for elastically pushing the centering hooks K upward by the leaf springs F is that a creep phenomenon where the plastic centering hooks K absorb moisture and lose elasticity is liable to occur under a high humidity environment, so this enables the plastic elasticity of the elastic tongues K1 to be reduced.

Summarizing the problems to be solved by the invention, there have been the following problems in a disk centering mechanism using the above plastic centering hooks K and leaf springs F:

First, since the centering hooks K are in the final analysis supported at the bottom by the elastic spring force of the leaf springs F, they are only significant as pushing members for elastically contacting the inner circumference of the disk hole and pushing on it outward in the radial direction joined with the turntable 2, but formation of the centering hooks K on the turntable 2 complicates the mold structure and invites a rise in the mold cost.

Second, the leaf springs F for supplementary elastic spring force have to be bonded or welded to the back surface side of the center hole 2a of the turntable 2 before fitting the center hole 2a of the turntable 2 over the motor shaft 1a. Not only is this complicated, but also variation in the mounting accuracy or press fit strain arising when fitting the center hole 2a of the turntable 2 over the motor shaft 2 etc. cause variation in the supplementary elastic spring force, so strictness is required in the work of attaching the leaf springs. This invites a drop in the work efficiency.

SUMMARY OF THE INVENTION

A first object of the present invention is to provide a turntable assembly having a disk centering mechanism not requiring use of plastic centering hooks and able to simplify the mold structure.

A second object of the present invention is to provide a turntable assembly enabling the leaf springs for giving elastic spring force in the disk centering mechanism to be attached even after fitting the center hole of the turntable over the motor shaft.

In the present invention, the inventors came up with the idea of providing the leaf springs for imparting elastic spring force in the disk centering mechanism on the upper side of the turntable. That is, the turntable assembly according to the present invention has a motor having a projecting motor shaft and a turntable having a center hole into which the projecting portion of the motor shaft is inserted and a magnet holding groove formed at a disk hole mating hub around the center hole and has a permanent magnet for clamping an information storage disk placed on the turntable in the magnet holding groove. In the present invention, the disk hole mating hub has a plurality of spring seats at spring flexing spaces formed at intervals in the circumferential direction, each of the spring seats is provided with a centering leaf spring having a front end protruding slightly outward in the radial direction from the circumference of the disk hole mating hub, and a front end of each centering leaf spring elastically contacts an inner circumference of the disk hole and pushes on it outward in the radial direction when the disk hole of the information storage disk is mated with the disk hole mating hub.

Due to this configuration, since no plastic centering hooks are used, not only is there no problem in creep phenomenon etc., but also it is possible to simplify the mold structure and possible to realize a reduction in mold cost. Further, since the centering leaf springs are provided at the spring seats at the spring flexing spaces, it is possible to attach the centering leaf springs even after fitting the center hole of the turntable over the motor shaft, so the efficiency of the assembly work can be improved.

Here, to further improve the efficiency of the work of attaching the centering leaf springs, it is preferable that the base ends of the centering leaf springs be fixed by an insert type spring holder from above. It is possible to attach the centering leaf springs by just inserting the insert type spring holder.

As an insert type spring holder, it is possible to use the clamping use permanent magnet holding the base ends of the centering leaf springs with the outer inner circumference of the magnet holding groove. It is possible to keep from adding a special part as the insert type spring holder and therefore to reduce the costs. Since it is possible to use the attachment operation of the permanent magnet, the attachment work can be streamlined. Further, since the centering leaf springs can be made of phosphor bronze, stainless steel, or another magnetic material, it is possible to use the attraction force of the clamping use permanent magnet for attaching the centering leaf springs in addition to insertion.

The assembly can have a back yoke below the permanent magnet in the magnet holding groove, and the insert type spring holder can be made the back yoke holding the base ends of the centering leaf springs with the outer inner circumference of the magnet holding groove.

If the plurality of centering leaf springs are separate parts, the positioning etc. become complicated, so the plurality of centering leaf springs preferably are integrally connected to a flat ring. The support ring is preferably fit over the motor shaft laid over a bottom surface of the permanent magnet in the magnet holding groove. Since the centering leaf springs are fixed not only at their base ends, but also at the support ring, the mounting accuracy of the centering leaf springs can be standardized. Further, it is possible to make joint use of this as a back yoke. The support ring may also be held between the top surface of a back yoke held in the magnet holding groove and a bottom surface of the permanent magnet.

The front end of each centering leaf spring may be made a vertically descending piece in facial contact with the inner circumference of the disk hole. Further, a flex point of the centering leaf spring is preferably between an outside angular part of the spring seat and an upward taper of an outer circumference of the disk hole mating hub. Since the flex point of the centering leaf spring can be positioned relatively far from the front end contacting the inner circumference of the disk hole, the arc of the front end accompanying flexing of the centering leaf spring can be made larger and the inner circumference of the disk hole can be pushed on outward in the radial direction.

BRIEF DESCRIPTION OF THE DRAWINGS

These and other objects and features of the present invention will become clearer from the following description of a preferred embodiment given with reference to the attached drawings, wherein:

FIG. 1A is a plan view of a turntable assembly of the prior art, while FIG. 1B is a longitudinal sectional view along the line B—B of FIG. 1A;

DESCRIPTION OF THE PREFERRED EMBODIMENTS

A preferred embodiment of the present invention will be described in detail below while referring to the attached figures.

Figure 2:
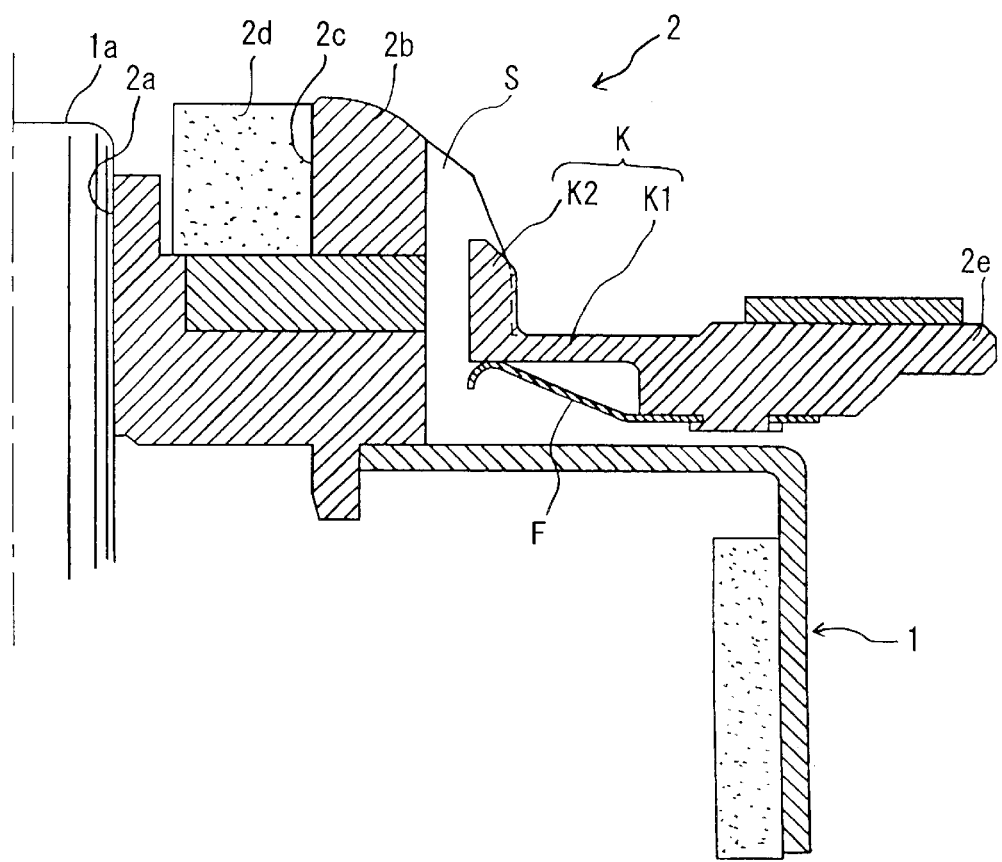
FIG. 2 is a partial sectional view showing a clamp mechanism and disk centering mechanism of the turntable assembly shown in FIGS. 1A and 1B enlarged.
Figure 3A:
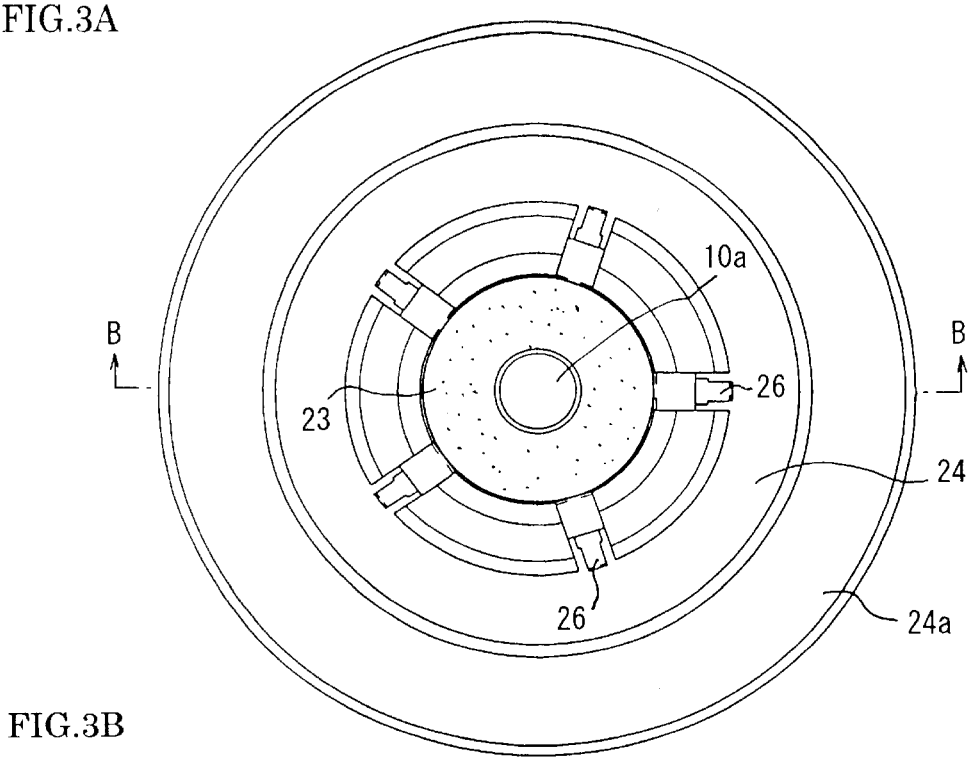
FIG. 3A is a plan view of a turntable assembly according to an embodiment of the present invention.
Figure 3B:
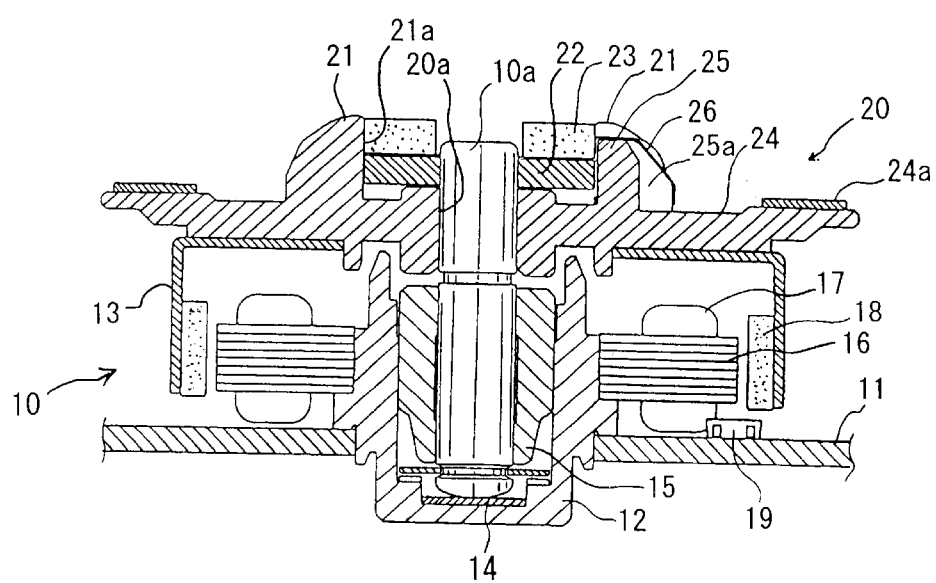
FIG. 3B is a longitudinal sectional view along the line B—B of FIG. 3A.
Figure 4:
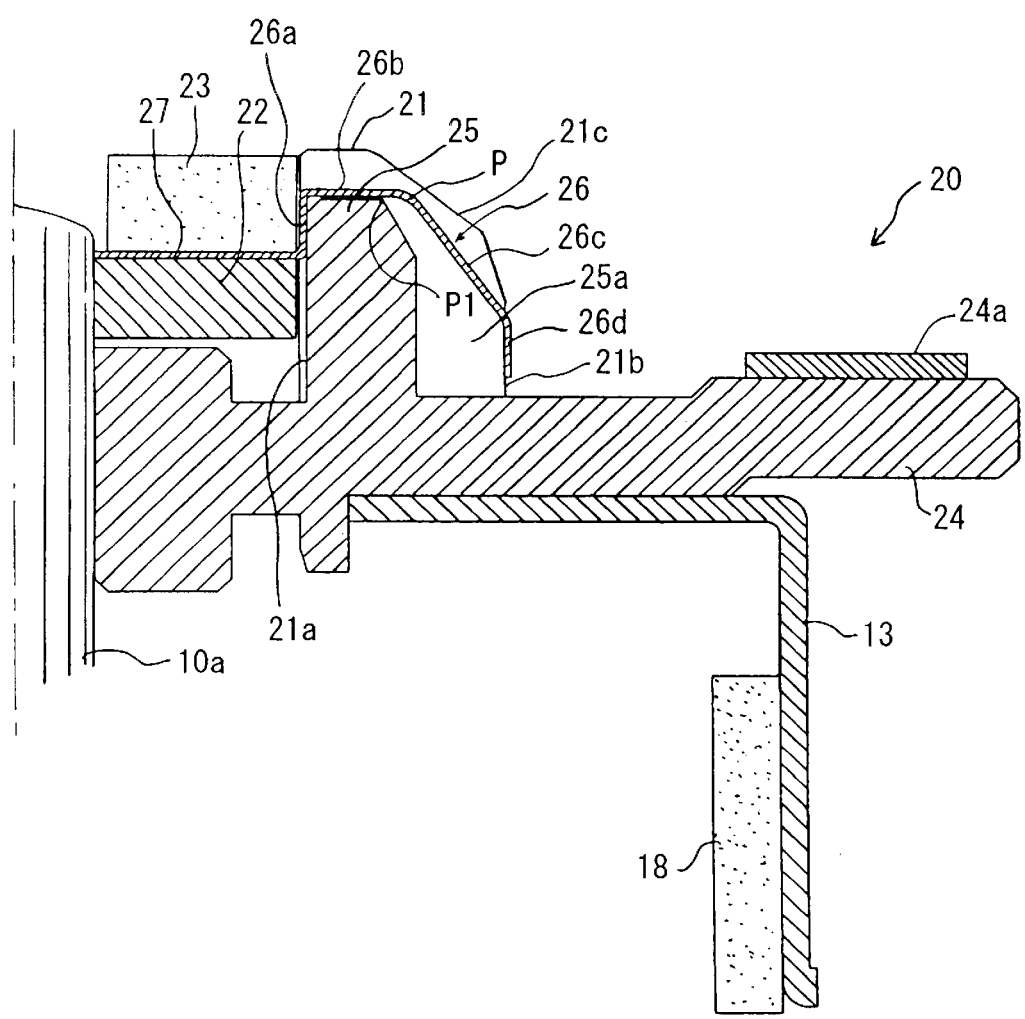
FIG. 4 is a partial sectional view showing a clamp mechanism and disk centering mechanism of the turntable assembly shown in FIGS. 3A and 3B enlarged.

FIG. 3A is a plan view of a turntable assembly according to an embodiment of the present invention, while FIG. 3B is a longitudinal sectional view along the line B—B of FIG. 3A. FIG. 4 is a partial sectional view showing a clamp mechanism and disk centering mechanism of the turntable assembly shown in FIGS. 3A and 3B enlarged.

The turntable assembly of this embodiment has a spindle motor (brushless motor) 10 having a closed-end cylindrical bearing housing (core holder) 12 on a printed circuit board (base 11) attached to the chassis at the player body side (not shown) and a plastic turntable 20 having a back surface press-fit to the top surface of an upside-down cup-shaped yoke 13 of the outer rotor and having a center hole 20 into which a projecting portion of the motor shaft 10a is press fit.

The turntable 20 has a magnet holding groove 21a formed at the center of a disk hole mating hub 21 around the center hole 20a, a ring-shaped back yoke 22 bonded to a bottom surface of the magnet holding groove 21a, a ring-shaped permanent magnet 23 held in the magnet holding groove 22 by magnetic attraction so as to overlay the back yoke 22, and a ring-shaped cushion member 24a adhered to the outer circumference of the thin disk flange 24. The back yoke 22 increases the magnetic flux density of the ring-shaped permanent magnet 23 passing through the magnetic material in the disk holder (not shown) placed on the disk hole mating hub 21 and strengthens the clamping attraction force. The center hole of the back yoke 22 is fit over the top end of the motor shaft 10a. In contour, the disk hole mating hub 21 has an upper tapered surface 21c and a lower tapered surface 21d between its top surface and its outer circumference 21b.

Figure 5A:
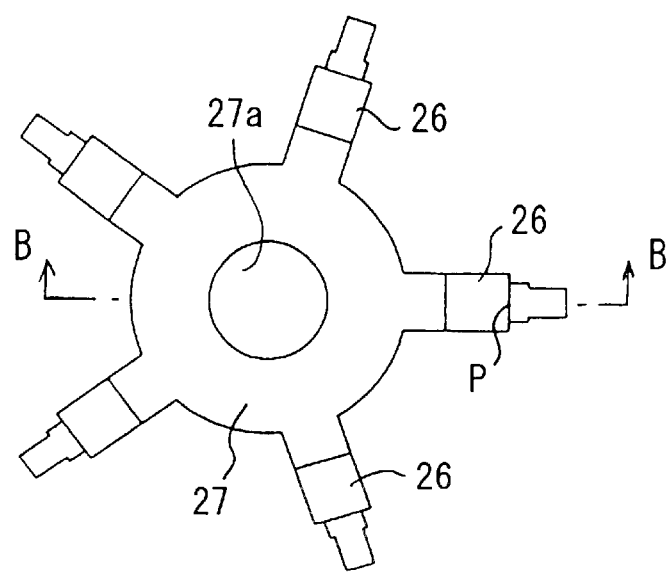
FIG. 5A is a plan view of a leaf spring used in the disk centering mechanism of a turntable assembly.
Figure 5B:
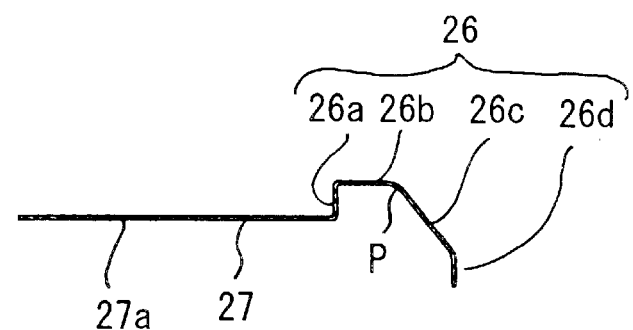
FIG. 5B is a sectional view along the line B—B of FIG. 5A.

In the disk centering mechanism of this embodiment, the disk hole mating hub 21 has five spring seats 25 at the spring flexing spaces 25a as notches formed at equal intervals in the circumferential direction. Each spring seat 25 is provided with a centering leaf spring 26 with a front end protruding slightly from the outer circumference 21b of the disk hole mating hub 21 outward in the radial direction. The five centering leaf springs 25, as shown in FIGS. 5A and 5B, are formed integrally from a magnetic material such as phosphor bronze or stainless steel and connected in a star configuration to a center support ring 27. Each centering leaf spring 26 is comprised of a rising piece 26a protruding from the outer circumferential end of the hub support ring 27 outward in the radial direction and then rising up, a top piece 26b bent outward in the radial direction from the rising piece 26a, an inclined piece 26c extending downward at an incline from the top piece 26b, and a vertically descending piece 26d bent substantially vertically downward from the inclined piece 26c. The hub support ring 27 is held between the back yoke 22 and the permanent magnet 23. The center hole 27a of the hub support ring 27 is fit over the motor shaft 10a. Therefore, the rising pieces 26a of the centering leaf springs 26 are held between the outer circumference of the permanent magnet 23 and the outside inner circumference of the magnet holding groove 21a. Further, the top pieces 26b overlay the top surfaces of the spring seats 2, so the rising pieces 26a and the top pieces 26b form cantilever supporting ends at their base end sides. Therefore, the bends between the top pieces 26b and the inclined pieces 26c form the flex points P. The flex points P are between the outside angular parts P1 of the spring seats 25 and the upper tapered surfaces 21c of the outer circumference of the disk hole mating-hub 21. Note that the inclined pieces 26c are formed to a narrower width than the top pieces 26b, the vertically descending pieces 26d are formed to a narrower width than the inclined pieces 26c, and therefore the centering leaf springs 26 are made uneven strips in order to secure the amount of flexing of their front ends.

Note that reference numeral 14 is a thrust bearing plate supporting the bottom end of the motor shaft 10a, 15 is a bearing metal of the motor shaft 10a, 16 is a stacked core of the stator, 17 is a winding coil, 18 is a rotor magnet, and 19 is a Hall element.

In this configuration, when the disk hole of the information storage disk is mated with the disk hole mating hub 21, when the inner circumferential edge of the disk hole reaches the outer circumference 21b while abutting against the upper tapered surface 21c to the lower tapered surface 21d of the disk hole mating hub 21, the vertically descending pieces 26d of the centering leaf springs 26 elastically contact the inner circumference of the disk hole and push on it outward in the radial direction, thereby realizing centering and chucking of the disk. Since no plastic centering hooks are used, not only is there no problem with the creep phenomenon etc., but also it is possible to simplify the mold structure and possible to realize lower mold cost. Further, the centering leaf springs 26 can be simply attached just by fitting the permanent magnet 23 over the back yoke 22 even after fitting the center hole 20a of the turntable 20 over the motor shaft 10a, so the efficiency of the assembly work can be improved. Further, since the hub of the back yoke 22 fits over the top end of the motor shaft 10a using the motor shaft 10a as a guide, the back yoke 22 functions as a rigid spacer and the positioning by the vertically descending pieces 26d of the centering leaf springs 26 is performed with a high accuracy, so the centering is improved. Further, since the hub support ring 27 functions jointly as a back yoke, the back yoke 22 can be reduced in thickness or eliminated. Further, the flex point P of each centering leaf spring 26 is between the outside angular part P1 of the spring seat 25 and the upper tapered surface 21c of the outer circumference of the disk hole mating hub 21, so the flex point P of the centering leaf spring 26 can be made relatively far from the front end contacting the inner circumference of the disk hole and therefore the arc of the front end accompanying flexing of the centering leaf spring 26 can be made large and the inner circumference of the disk hole can be pushed on outward in the radial direction.

Note that the turntable 20 and the yoke 13 of the motor 10 may be insert molded. Further, a contact member may be added to the vertically descending piece 26d of each centering leaf spring 26.

Summarizing the effects of the invention, the present invention has the following effects as explained above:

First, since no plastic hooks are used, not only is there no problem with any creep phenomenon etc., but also it is possible to simplify the mold structure and to realize low mold cost. Further, since the centering leaf springs are provided at the spring seats at the spring flexing spaces, the centering leaf springs can be attached even after fitting the center hole of the turntable over the motor shaft, so the efficiency of the assembly work can be improved.

Second, since the centering leaf springs can be attached by just inserting the insert type spring holder, it is possible to use the clamping use permanent magnet holding the base ends of the centering leaf springs with the outer inner circumference of the magnet holding groove as the insert-type spring holder. It is possible to keep from adding a special part as the insert type spring holder and therefore to reduce the cost. Since it is possible to use the attachment operation of the permanent magnet, the attachment work can be streamlined. Further, since the centering leaf springs can be made of phosphor bronze, stainless steel, or another magnetic material, it is possible to use the attraction force of the clamping use permanent magnet for attaching the centering leaf springs in addition to insertion.

Third, when the plurality of centering leaf springs are integrally connected to a support ring, the support ring can be held at the bottom surface of the permanent magnet. Since the centering leaf springs are fixed not only at their base ends, but also at the support ring, the mounting accuracy of the centering leaf springs can be equalized. Further, it is possible to make joint use of this as a back yoke.

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2001-317947, filed on Oct. 16, 2001, the disclosure of which is expressly incorporated herein by reference in its entirety.

What is claimed is:

1. A turntable assembly comprised of a motor having a projecting motor shaft and a turntable having a center hole into which the projecting portion of said motor shaft is inserted, and a magnetic holding groove formed concentrically about a disk hole mating hub around the center hole and having a permanent magnet for clamping an information storage disk placed on said turntable in said magnet holding groove, wherein said disk hole mating hub has a plurality of spring seats defined by spring flexing spaces disposed at intervals in the circumferential direction about said center hole, each of said spring seats being provided with a centering leaf spring including a support portion clamped upon said turntable, said leaf spring having a front end protruding outwardly in the radial direction from the circumference of said disk hole mating hub, wherein the front end of said centering leaf spring is operative to elastically contact an inner circumference of a center hole of a disk mounted on said turntable to push it outward in the radial direction when the disk hole of said information storage disk is concentrically mated with the disk hole mating hub.

2. A turntable assembly as set forth in claim 1, wherein said support portion includes base ends of said centering leaf spring clamped to said turntable from above by being held by an insert-type spring holder.

3. A turntable assembly as set forth in claim 2, wherein said insert-type spring holder is said permanent magnet that clamps the support portion of said centering leaf spring with respect to the magnet holding groove.

4. A turntable assembly as set forth in claim 2, wherein the insert type spring holder includes a back yoke disposed below said permanent magnet in said magnet holding groove and cooperating with said permanent magnet to hold the base ends of said centering leaf spring within an outside inner circumference of said magnet holding groove.

5. A turntable assembly as set forth in claim 1, wherein said plurality of centering leaf springs are integrally connected to a support ring.

6. A turntable assembly as set forth in claim 5, wherein said support ring is concentrically fit over said motor shaft underlying a bottom surface of said permanent magnet in said magnet holding groove.

7. A turntable assembly as set forth in claim 6, wherein said support ring is clamped between a top surface of a back yoke held in said magnet holding groove and a bottom surface of said permanent magnet.

8. A turntable assembly as set forth in claim 1, wherein a front end of said centering leaf spring is a vertically descending piece for facially contacting an inner circumference of said center hole of a disk mated with the disk hole mating hub.

9. A turntable assembly as set forth in claim 1, wherein a flex point of said centering leaf spring is between an outside angular part of said spring seat and an upper tapered surface of an outer circumference of said disk hole mating hub.

* * * * *

UNITED STATES PATENT AND TRADEMARK OFFICE
CERTIFICATE OF CORRECTION

PATENT NO. : 6,832,384 B2
DATED : December 14, 2004
INVENTOR(S) : Tsuyoshi Yamaguchi It is certified that error appears in the above-identified patent and that said Letters Patent is hereby corrected as shown below:

Title page,
Item [75], Inventor, change "Tsuyoshi Yamaguchi, Marako-machi (JP)" to be
-- Tsuyoshi Yamaguchi, Nagano-ken (JP) --.
Item [73], Assignee, change "Sanyo Electric Co., Ltd., Moriguchi" to be
-- Sanyo Electric Co., Ltd., Osaka-fu (JP) --.

Signed and Sealed this

First Day of November, 2005

JON W. DUDAS
*Director of the United States Patent and Trademark Office*